United States Patent [19]

Holzinger

[11] 4,270,563

[45] Jun. 2, 1981

[54] PRESSURE ACTUATED SAFETY DEVICE

[75] Inventor: Karl Holzinger, Nussbaumen, Switzerland

[73] Assignee: BBC Brown, Boveri & Co. Ltd., Baden, Switzerland

[21] Appl. No.: 53,045

[22] Filed: Jun. 28, 1979

[30] Foreign Application Priority Data

Oct. 7, 1978 [CH] Switzerland ........................ 7457/78

[51] Int. Cl.³ ............................................ G05D 11/00

[52] U.S. Cl. ............................ 137/116.5; 137/505.47

[58] Field of Search .................... 137/14, 116.3, 116.5, 137/505.46, 505.49

[56] References Cited

U.S. PATENT DOCUMENTS

| | | | |
|---|---|---|---|
| 370,715 | 9/1887 | Smith | 137/505.47 |
| 1,361,636 | 12/1920 | Stage | 137/116.3 |
| 2,026,249 | 12/1935 | Pierson | 137/116.3 |
| 2,854,990 | 10/1958 | Granberg | 137/505.47 |

*Primary Examiner*—William R. Cline
*Assistant Examiner*—H. Jay Spiegel
*Attorney, Agent, or Firm*—Burns, Doane, Swecker & Mathis

[57] ABSTRACT

A safety device for preventing overpressures in low pressure reservoirs receiving compressed gas through a feedline connected to a high pressure source is disclosed including a spherical stopcock in the feedline. A cylinder is provided in pressure communication with the low pressure reservoir with a spring-biased piston arranged within the cylinder. Connected to the piston and projecting from the cylinder is a toothed rack having teeth which intermesh with teeth of a rotatable, toothed segment connected to the stopcock. Motion of the piston, in response to pressure changes in the low pressure reservoir, causes the toothed rack to open or close the stopcock. A hole in the wall of the cylinder allows excess compressed air or gas to escape to the atmosphere in the event that the maximum allowable pressure within the low pressure reservoir is exceeded.

3 Claims, 2 Drawing Figures

PRESSURE ACTUATED SAFETY DEVICE

BACKGROUND AND SUMMARY OF THE PRESENT INVENTION

The present invention relates generally to automatic safety devices for pressurized tanks and more particularly relates to automatic safety devices for use with pressurized tanks of gas blast circuit breakers.

Automatic safety devices are known, for example, to protect the low pressure reserviors of gas blast circuit breakers against overpressures. Typically a gas blast circuit breaker includes a source of high pressure gas which provides compressed gas to a low pressure reservoir. To protect the low pressure reservoir against overpressures prior art safety devices, generally featuring a spring-loaded safety valve, have been attached to the low pressure reservoir. The spring-loaded safety valves then release the compressed gas from the low pressure reservior to the atmosphere in the event of an overpressure.

These prior art safety devices, however, have not been entirely satisfactory in that significant amounts of the high pressure reserve of the compressed gas are released to the atmosphere. This release is often accompanied by considerable noise. In addition, it has often been necessary to take measures to prevent environmental and weather effects from interfering with the operation of these prior art safety devices.

Accordingly, it is a primary object of the present invention to provide a safety device which will prevent overpressures from occurring in low pressure reservoirs connected to high pressure sources, particularly the low pressure reservoirs used in gas blast circuit breakers.

Another object of the present invention is to provide a safety device which protects low pressure reservoirs, connected to high pressure sources, against overpressures without producing excessive noise.

A further object of the present invention is to provide a safety device which protects low pressure reservoirs, connected to high pressure sources, against overpressures with little or no depletion of the high pressure reserve of compressed gas.

Yet another object of this invention is to provide a safety device which is substantially unaffected by icing, contamination, and other adverse weather and environmental effects.

An automatic, pressure actuated safety device for a low pressure reservoir receiving compressed gas from a high pressure source, according to the present invention, includes a cylinder in pressure communication with the low pressure reservoir. A spring-biased piston is provided within the cylinder with a toothed rack fastened to the piston projecting from a first opening in the cylinder. The safety device also includes a spherical stopcock on a feed line connecting the high pressure source to the low pressure reservoir, which stopcock has a toothed segment that is engaged by the toothed rack projecting from the cylinder. Longitudinal motion of the toothed rack urges the spherical stopcock to open or close.

A preferred embodiment of the safety device, according to the present invention, further includes a second opening in the cylinder which allows compressed gas in the cylinder to be released to the atmosphere.

BRIEF DESCRIPTION OF THE DRAWINGS

A preferred embodiment of the present invention is described with reference to the accompanying drawings wherein like members bear like reference numerals and wherein.

DETAILED DESCRIPTION OF THE PREFERRED EMBODIMENT

Figure 1:
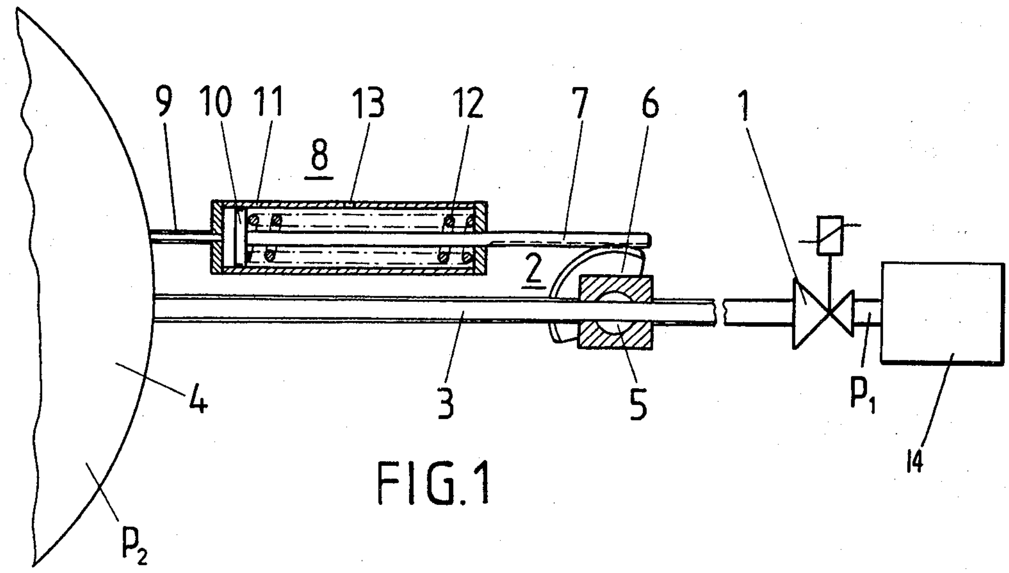
FIG. 1 is a cross-sectional view of a preferred embodiment of the safety device, according to the present invention, with the stopcock rotated to the open position, to permit compressed gas to flow from the high pressure source to the low pressure reservoir.
Figure 2:
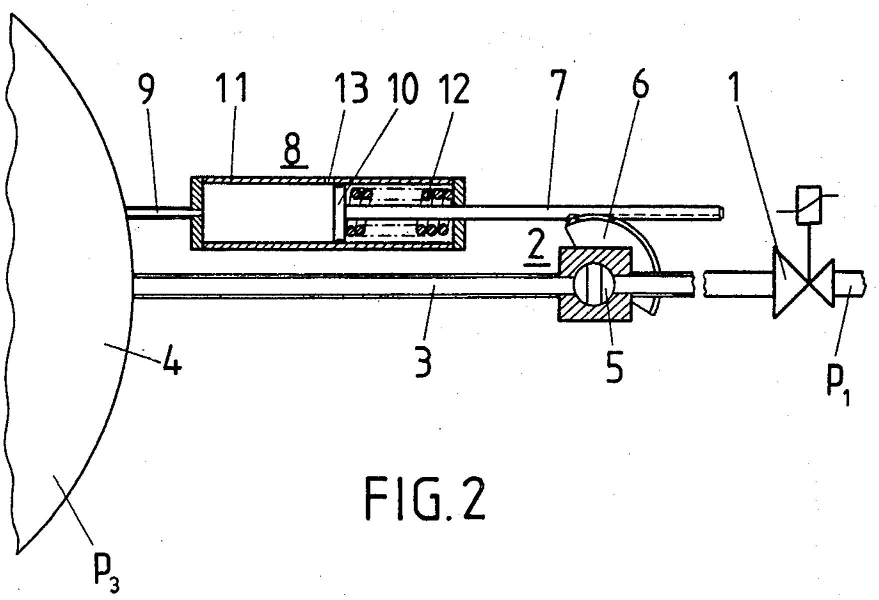
FIG. 2 is a cross-sectional view of the safety device of FIG. 1, with the stopcock rotated to the closed position.

With reference to FIG. 1, a safety device according to the present invention includes a valve 1 which regulates a flow of compressed gas from a high pressure source 14 to a low pressure reservoir 4 of a gas blast circuit breaker. The compressed gas is supplied through a feedline 3. A gas pressure $P_1$ in the high pressure source may, for example, be 150 bar, while the normal gas pressure $P_2$ in the low pressure reservoir may, for example, be 28 bar.

A spherical stopcock 2 is provided in the feedline 3 between the high pressure source 14 and the low pressure reservoir 4. The stopcock 2 features a cock 5 which is connected to a toothed segment 6. Rotation of the toothed segment 6 causes the stopcock to open or to close, thereby opening or closing the feedline 3.

An actuator 8 regulates the rotation of the toothed segment 6 of the stopcock 2. The actuator 8 includes a cylinder 11 which is connected to the low pressure reservoir 4 by a feed line 9. The cylinder 11 contains a piston 10 which is biased in the direction of the low pressure reservoir 4 by a spring 12. Connected to the piston 10 and projecting from the cylinder 11 is a toothed rack 7 having teeth which mesh with teeth of the toothed segment 6 of the stopcock 2. Longitudinal movement of the piston 10 and the toothed rack 7 results in a rotational movement of the toothed segment 6 of the stopcock 2.

A wall of the cylinder 11 is provided with an opening 13 which permits excess compressed gas from within the cylinder 11 (coming from the reservoir 4) to be released to the atmosphere. This release of compressed gas occurs whenever a maximum allowable pressure $P_3$ within the reservoir 4 is exceeded. The factors which may cause the maximum allowable pressure $P_3$ to be exceeded are, for example, a temperature rise in reservoir 4 or a leak at the stopcock 2 when the stopcock is in the closed position.

The method of operation of the safety device described above, is as follows. After a switching or circuit breaking operation, the pressure in the low pressure reservoir 4 of the gas blast circuit breaker will drop. Then the valve 1 will open to fill the low pressure reservoir 4 to a normal operating pressure $P_2$ of, for example, 28 bar. If the valve 1 should then fail to close, owing to some defect, the compressd gas will continue to flow through the opened spherical stopcock 2 and the feedline 3 to the low pressure reservoir 4.

As soon as the pressure in the reservoir 4 exceeds the normal operating pressure $P_2$, the higher than normal pressure will be communicated to the piston 10 of the actuator 8 through the feedline 9. The higher than normal pressure will cause the piston 10 to overcome the biasing force of the spring 12 and move in a direction away from the reservoir 4. As the piston 10 moves, the toothed rack 7 will also move and simultaneously rotate the toothed segment 6, to close the stopcock 2 and thus interrupt the flow of compressed gas to the reservoir 4.

The biasing spring 12 is dimensioned so that the piston 10 will only start to move in the event that the normal operating pressure $P_2$ in reservoir 4 is exceeded. Should the maximum allowable pressure $P_3$ in the reservoir 4 be exceeded, the piston 10 will move sufficiently far within the cylinder 11 so that the opening 13 (in the wall of the cylinder 11) will be exposed. Excess high pressure gas in the reservoir 4 will thereby be permitted to escape through the opening 13 to the atmosphere.

If the pressure in the reservoir 4 should fall below the maximum allowable pressure $P_3$, then the piston 10 will move in the opposite direction, i.e., toward the reservoir 4, under the influence of the biasing force of spring 12. Furthermore, if the pressure in the reservoir 4 should drop sharply, perhaps as a result of a circuit breaking operation, the spring 12 will force the piston 10 to undergo a large shift toward reservoir 4, resulting in the opening of the spherical stopcock 2.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. In a gas blast circuit breaker of the type having a low pressure reservoir for compressed gas, a source of gas at high pressure and supply means for conducting gas through a feed line from the high pressure source to the low pressure reservoir, said feed line ending at said reservoir, a safety device for preventing overpressures in the low pressure reservoir comprising:
   - safety valve means for interrupting a flow of the compressed gas through said feed means, which safety valve means includes a spherical stopcock, said spherical stopcock including a cock connected to a rotatable, toothed segment; and
   - actuating means for actuating said safety valve means in response to a pressure within said low pressure reservoir exceeding a predetermined pressure, said actuating means including:
     - a cylinder in pressure communication with said low pressure reservoir, which cylinder senses a pressure in said low pressure reservoir through a line which is independent from said feed line;
     - a spring-biased piston arranged within said cylinder;

and

- a toothed rack connected to said piston and projecting from said cylinder, the rack having teeth which mesh with the teeth of the toothed segment of the spherical stopcock.

2. In a gas blast circuit breaker of the type having a low pressure reservoir for compressed gas, a source of gas at high pressure and supply means for conducting gas through a feed line from the high pressure source to the low pressure reservoir, said feed line ending at said reservoir, a safety device for preventing overpressures in the low pressure reservoir comprising:
   - regulating valve means for regulating a flow of the compressed gas through said feed means;
   - safety valve means for interrupting a flow of the compressed gas through said feed means, which safety valve means includes a spherical stopcock, said spherical stopcock including a cock connected to a rotatable, toothed segment; and
   - actuating means for actuating said safety valve means in response to a pressure within said low pressure reservoir exceeding a predetermined pressure, said actuating means including:
     - a cylinder in pressure communication with said low pressure reservoir, which cylinder senses a pressure in said low pressure reservoir through a line which is independent from said feed line;
     - a spring-biased piston arranged within said cylinder;

and

- a toothed rack connected to said piston and projecting from said cylinder, the rack having teeth which mesh with the teeth of the toothed segment of the spherical stopcock.

3. The gas blast circuit breaker of claim 1 or claim 2 wherein the safety device further comprises gas release means within said actuating means for releasing compressed gas from said reservoir to the atmosphere, said gas release means including an opening in a wall of said cylinder, which opening is spaced apart from one end of the cylinder whereby communication is established between the low pressure gas reservoir and the opening when the spring-biased piston moves to a position beyond the opening.

* * * * *

UNITED STATES PATENT AND TRADEMARK OFFICE
CERTIFICATE OF CORRECTION

PATENT NO. : 4,270,563

DATED : Jun. 2, 1981

INVENTOR(S) : KARL HOLZINGER

It is certified that error appears in the above—identified patent and that said Letters Patent is hereby corrected as shown below:

On the title page, in column 1, line 9, under "Foreign Application Priority Data"

Delete "Oct. 7, 1978" and insert therefor --July 10, 1978--.

Signed and Sealed this

*First* Day of *December 1981*

[SEAL]

*Attest:*

GERALD J. MOSSINGHOFF

*Attesting Officer*

*Commissioner of Patents and Trademarks*